United States Patent [19]

Ashby

[11] Patent Number: 4,828,002
[45] Date of Patent: May 9, 1989

[54] WINDOW COVERING HEADRAIL CORNICE

[75] Inventor: Mark P. Ashby, Huntington Beach, Calif.

[73] Assignee: Home Fashions, Inc., Westminster, Calif.

[21] Appl. No.: 64,402

[22] Filed: Jun. 22, 1987

[51] Int. Cl.$^4$ ............................................. E06B 9/00
[52] U.S. Cl. ................................ 160/38; 160/21; 160/32; 160/902; 403/381; 403/331
[58] Field of Search .................. 160/38, 32, 21, 39, 160/902; 248/223.4, 251, 225.1, 231.8, 221.3, 221.4; 403/381, 331

[56] References Cited

U.S. PATENT DOCUMENTS

| | | | |
|---|---|---|---|
| 2,594,655 | 4/1952 | Junkunc | 160/38 |
| 3,064,724 | 11/1962 | Nowell | 248/221.4 X |
| 4,384,605 | 5/1983 | Schaeffer et al. | 160/38 |
| 4,662,421 | 5/1987 | Basmadji et al. | 160/38 |

FOREIGN PATENT DOCUMENTS 2706002  8/1978  Fed. Rep. of Germany ... 248/221.4

Primary Examiner—Blair M. Johnson
Attorney, Agent, or Firm—George J. Netter

[57] ABSTRACT

A cornice for the headrail of a window covering has an elongated front panel with grooves on a front surface for receiving decorative slats and a pair of longitudinal slots on the back surface. Clips hanging on the headrail have parts received within the front panel. Adjustable length side plates are assembled to the front panel by end pieces.

1 Claim, 4 Drawing Sheets

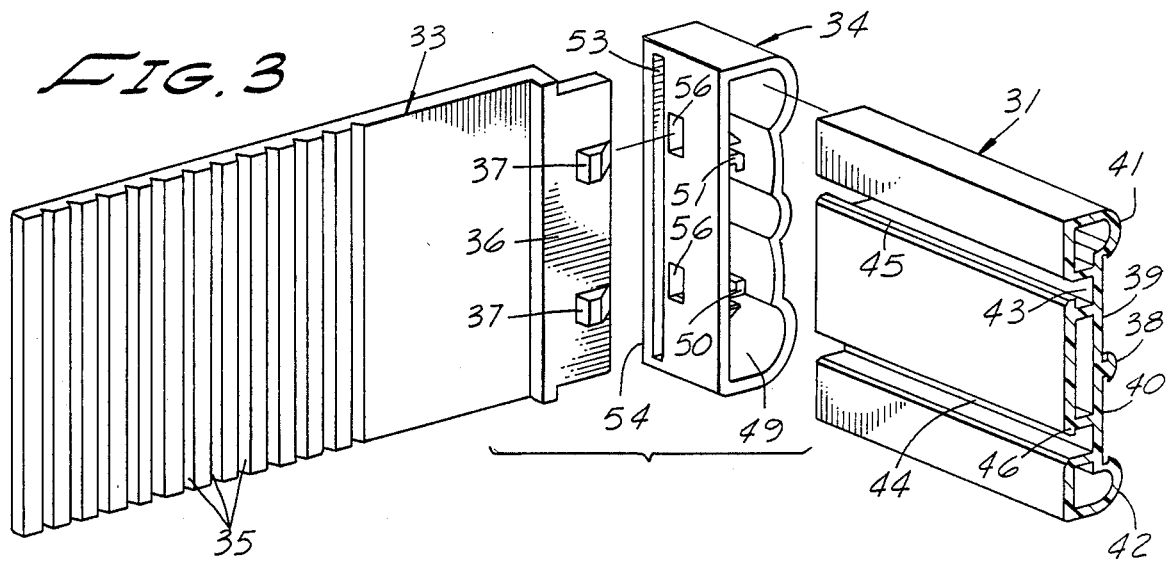
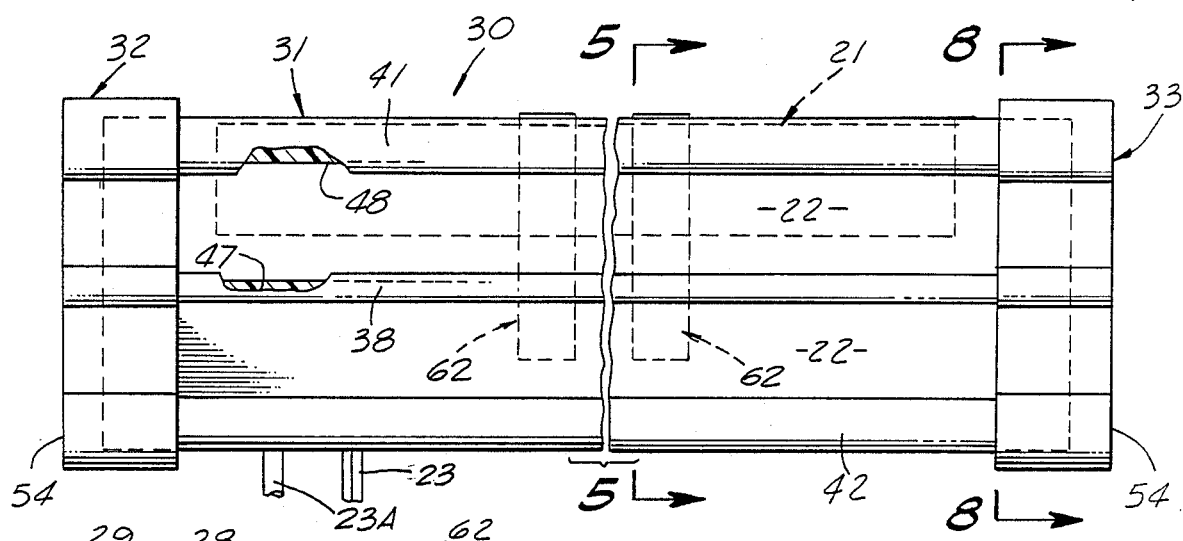
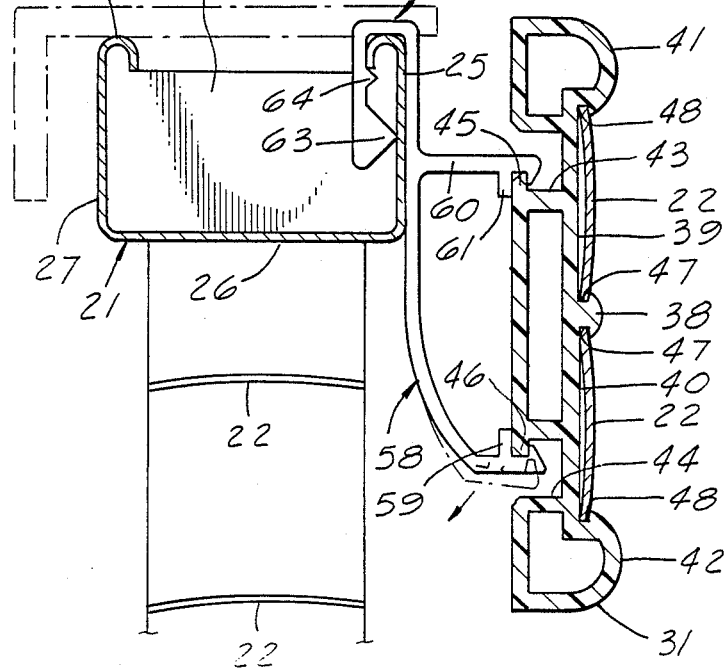

WINDOW COVERING HEADRAIL CORNICE

The present invention pertains generally to window coverings, and, more particularly, to an improved cornice for enclosing and ornamenting the headrail for such window coverings.

BACKGROUND OF INVENTION

There are a variety of window coverings used at the present which hang from a headrail mounted onto a vertical wall surface or from the ceiling of a room, and which consist generally of an elongated metal or plastic housing having an open top. One example of such a window covering is what is sometimes termed a "venetian blind" which has a plurality of slats that can be manipulated by cords to vary the amount of light to pass through the blind or to raise and lower the blind to any desired height. Another form of such window covering includes an extent of flexible pleated material which can be raised or lowered to any desired vertical position with the window covering material folding onto itself along the pleat lines.

It is known to enclose the headrail for such window covering units with a cornice permanently affixed to the headrail and/or wall by threaded means or the like so that once assembled to the headrail, the headrail, cornice and blind are a unit. Futhermore, the cornice is sometimes attached to the vertical wall only or sometimes to both the wall and the headrail. Such arrangements are impractical for many mounting locations, in that the presence of the cornice makes the headrail difficult to mount to the wall or ceiling. Also, an adjoining wall may reduce the available end space which could leave the ends of the window covering spaced inwardly so as not to cover a slit of a window, for example. Still further, such arrangements are rather bulky and heavy, and do not for that reason lend themselves to easy replacement in the event of damage, nor are they readily taken down for cleaning.

SUMMARY OF THE INVENTION

The headrail for the window covering to which the cornice to be described is mounted typically consists of an elongated, hollow metal or plastic housing which is open topped, and is U-shaped in cross-section having a front wall, a lower or bottom wall and a back wall. In use, the headrail is affixed in some suitable manner to a vertical wall surface to which it is desired to mount the window covering.

The cornice, in its major elements, includes a front panel member, two end plates, and two corner pieces which join the end plates to the front panel member. The various parts are snapped together forming a releasable, one-piece cornice which is mounted via two or more special clips to the front wall of the headrail for releasable securement thereto.

The front panel member is an elongated molded plastic or extruded plastic member including on its outwardly facing or front surface, a centrally located bead which separates two elongated, flat, generally parallel surfaces. Enlarged forwardly extending top and bottom ribs integral with the front panel member form upper and lower edge portions. Slots are formed in each side of the bead as well as on the facing portions of the ribs by virtue of which a flexible plastic or metal slat can be slidingly received. The slat can be of any desired color and in the case of a venetian blind, for example, may consist of one of the slats from which the blind is made thereby providing full color coordination, or of contrasting color, if desired.

The front panel member back surface includes a pair of longitudinal, parallel slots extending the full length of the panel member, one at each side of the center line defined by the bead on the front surface. Outer edges of the slots each include a flange for lockingly engaging portions of a mounting clip to be described.

The corner pieces each include a flat surface with grooves configured and dimensioned to receive an end of the front panel member therein and securely hold the front panel member end. A second flat surface at 90 degrees to the first flat surface includes a vertical slot which slidingly receives an end portion of an end plate to be described. That is, in assembly the corner pieces hold the two end plates to the front panel member in fixed, 90 degree relation to one another.

Each end plate consists of an elongated rectangular plastic member with a reinforced end portion that is so dimensioned and configured as to permit receipt in a corner piece vertical slot. In addition, a plurality of spaced apart vertical grooves are formed on the inner face of the end plate which serve as break lines for adjusting the end plate length to conform to available space.

Each mounting clip is a molded or extruded plastic member having a hooklike end received over the upper edge of the headrail front wall, and a pair of spaced apart keys located at the other end of the clip which are dimensioned to enable receipt within the back surface slots of the front panel member.

DESCRIPTION OF THE DRAWING

FIG. 3 is an exploded perspective view of the cornice parts viewed from inside the cornice.

FIG. 4 is a front elevational view of the cornice mounted on the headrail.

FIG. 5 is a side elevational, sectional view taken along the line 5—5 of FIG. 4.

DESCRIPTION OF PREFERRED EMBODIMENTS

Figure 1:
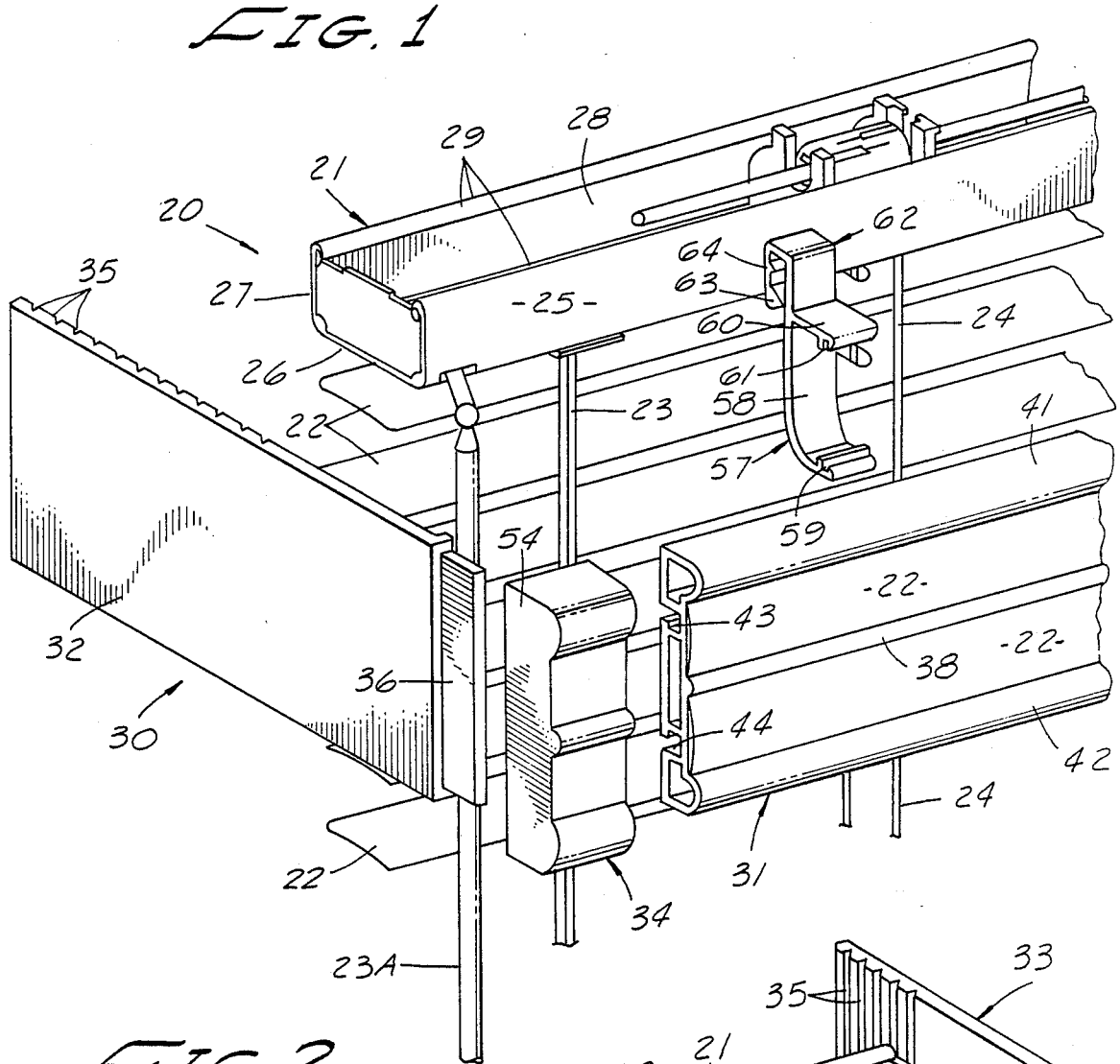
FIG. 1 is a perspective, partially fragmentary view of the cornice of this invention shown in exploded relation attendant being assembled onto a window covering headrail.

Turning now to the drawings and particularly FIG. 1, a window covering of the kind with which the cornice to be described is especially advantageous, is enumerated generally as 20, and is seen to consist generally of a headrail 21 for convenient mounting to a wall surface and from which a plurality of slats 22 carried by cords 23 and 24 hang downwardly in a conventional manner. Manipulation of the cords permits locating the blind at any desired vertical position. A tilter 23A enables tilting the slats 22 to adjust light and viewing through the blind. Other forms of window covering units with which the present invention may be advantageously employed also include the pleated fabric type which may be manipulated similarly to a venetian blind to any desired vertical position, the fabric folding onto itself along pleat lines.

The headrail 21 is a hollow housing constructed of metal or plastic and having a front wall 25, a bottom wall 26, a back wall 27 and an open top 28. The upper edges of the front and back walls 25 and 27 are rolled inwardly to form a substantially circular edge 29.

Figure 2:
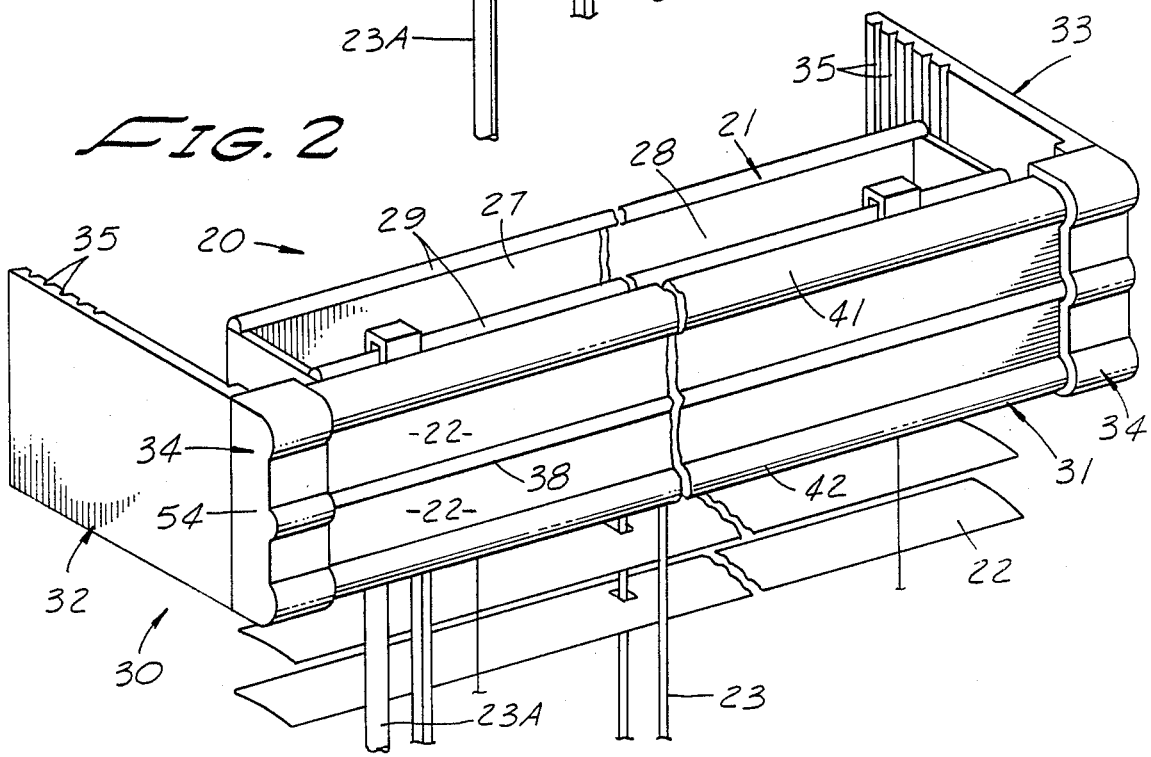
FIG. 2 is a perspective view similar to FIG. 1 showing the cornice fully assembled and mounted onto the headrail.
Figure 6:
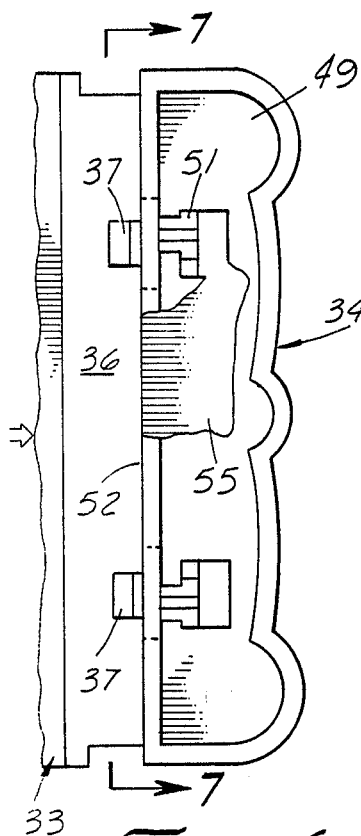
FIG. 6 is a side elevational sectional view taken through a corner piece.

The cornice of this invention, shown disassembled in FIG. 1 and assembled in FIG. 2, is enumerated generally as 30 and is seen to include in its major parts a front panel member 31, two end plates 32 and 33, and two corner pieces 34.

Each of the end plates 32, 33 consists of a one-piece, molded or extruded plastic member which is rectangular overall, and has a plurality of spaced-apart transversely extending grooves or break lines 35 on one end portion, as can be seen best in FIG. 3. The opposite end includes an offset portion 36 with a pair of detents 37 on the same side of the plate as the break lines 35, the purpose and use of which will be given later. As the name implies, the break lines provide a means by which the overall length of the end plates 32, 33 can be modified for any given location by simply breaking the plate along any desired line or groove.

The front panel member 31 is an elongated, generally rectangular member constructed of extruded plastic, for example, having on its front or outwardly facing major surface, a longitudinal bead 38 separating the surface into substantially equal portions. Relatively flat surface areas 39 and 40 exist on each side of the bead and the panel member upper and lower edges are defined by generally cylindrical portions 41 and 42, respectively, which extend forwardly of the flat surfaces and have a flat opposite or back face.

The rear surface of the front panel member includes a central portion which is flat and coplanar with the flat cylindrical portion back faces. First and second slots 43 and 44 on the rear surface of the front panel member are generally parallel to one another and extend longitudinally of the panel member. Flanges 45 and 46 extend partway into the respective slots 43 and 44.

As can be seen best in FIG. 5, each side of the bead 38 on the front panel member has a groove 47, and, as well, the cylindrical portions 41 and 42 include grooves 48 facing toward the bead. The spacing of these grooves is such as to enable receipt of a slat 22, for example.

From comparison of FIGS. 1 and 3, it can be seen that each corner piece 34 is of hollow, one-piece construction (e.g., molded or extruded plastic) having an open side 49 and so dimensioned and configured as to permit receipt of an end of the front panel member therewithin. In addition, first and second compressible keys 50 and 51 on the inner surface of a corner piece is located as to be received into the slots 43, 44, respectively, and become locked behind the flanges 45 and 46 when the corner pieces are placed on the front panel member ends.

A further surface 52 which is at 90 degrees to the open side of the corner piece includes a slot 53 spaced inwardly from the outer edge and of such dimensions and extent as to receive the end portion 36 of the side plate therein. The offset of the side plate end portion is sufficient that when the side plate is assembled onto the corner piece, the outer surface of the side plate will be coextensive with the outer end surface of the corner piece.

Figure 7:
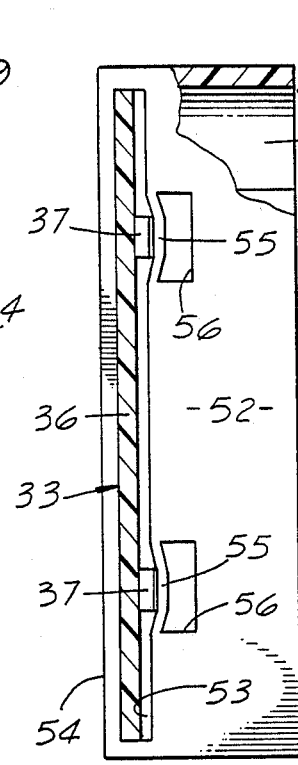
FIG. 7 is a sectional view taken along the line 7—7 of FIG. 6.
Figure 8:
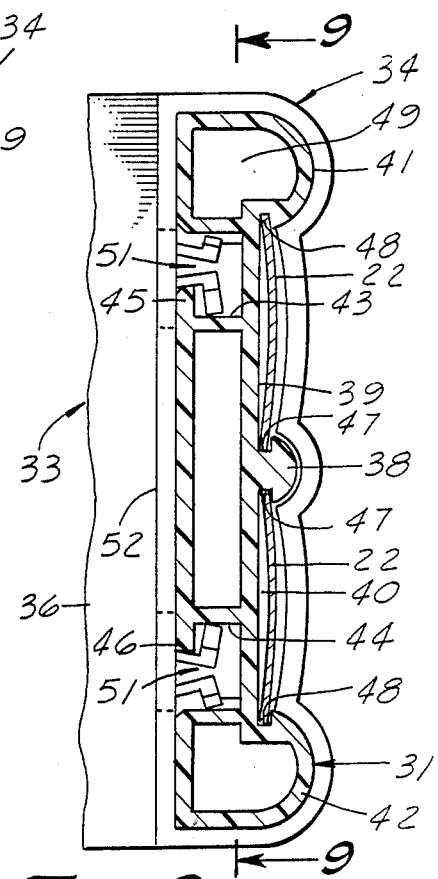
FIG. 8 is an end elevational, sectional view taken along the line 8—8 of FIG. 4.
Figure 9:
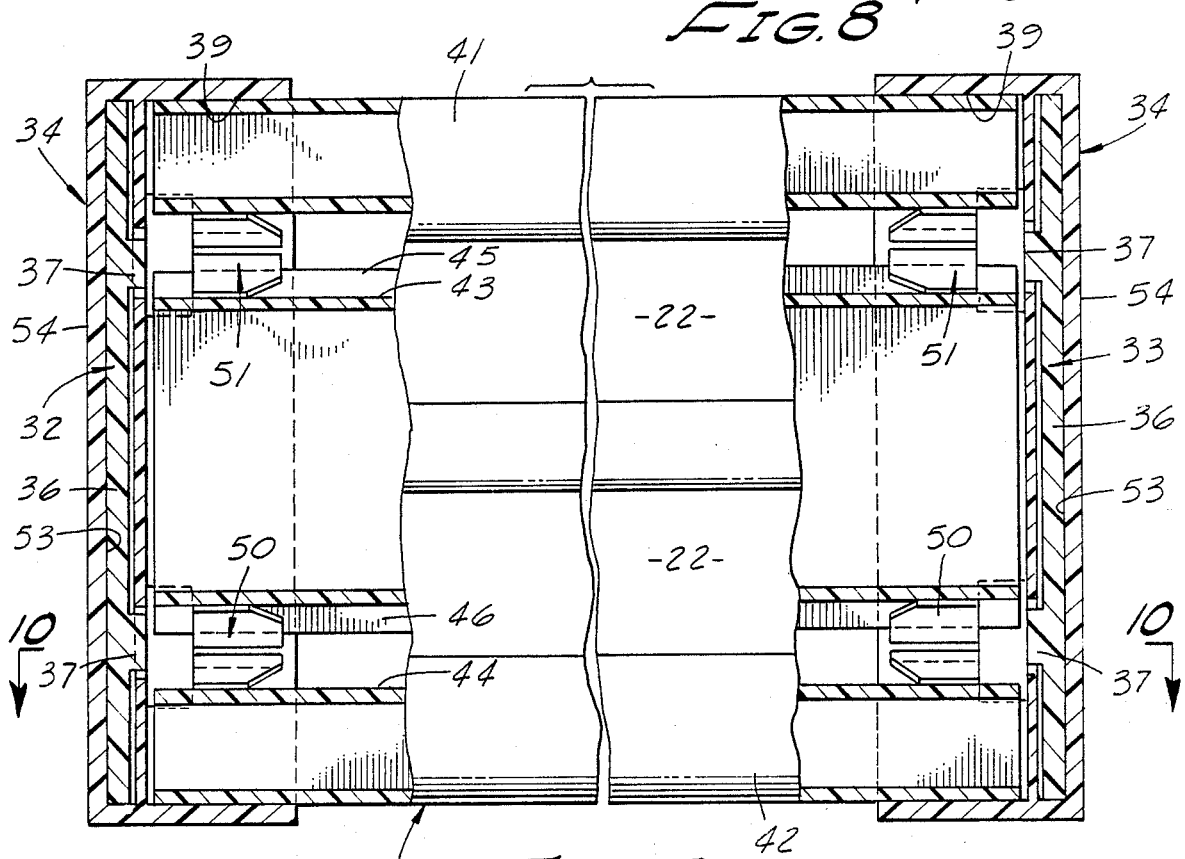
FIG. 9 is a side elevational, sectional, partially fragmentary view taken along the line 9—9 of FIG. 8.
Figure 10:
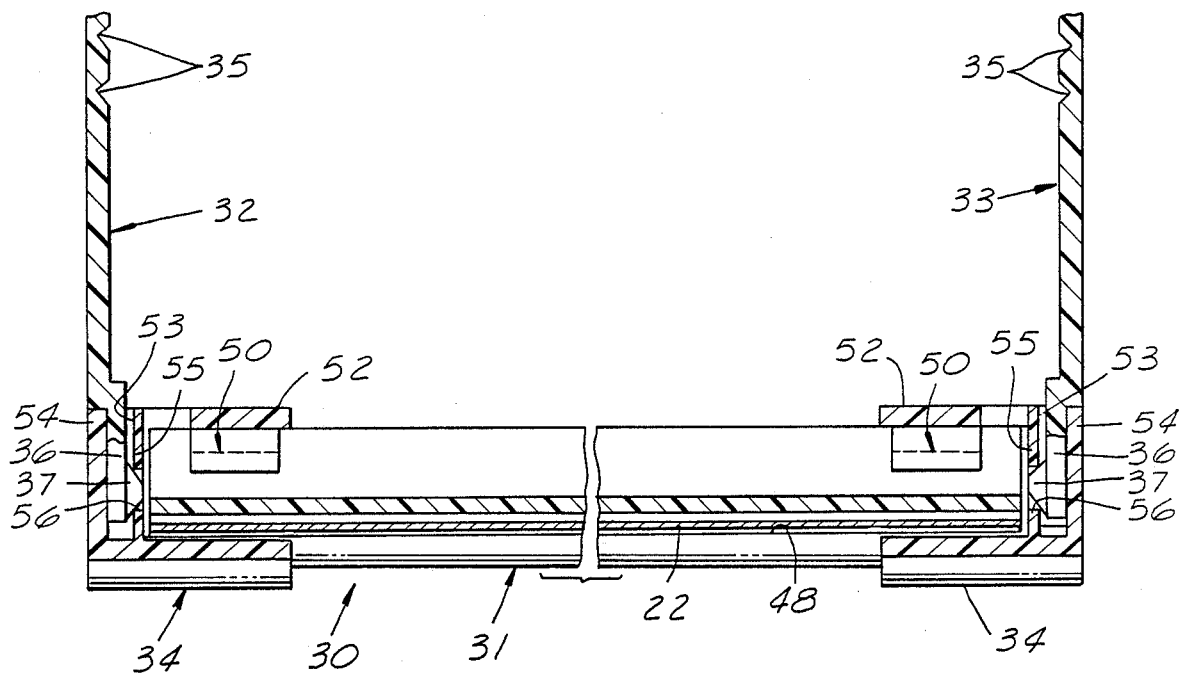
FIG. 10 is a further side elevational, sectional view taken along the line 10—10 of FIG. 9.
Figure 11:
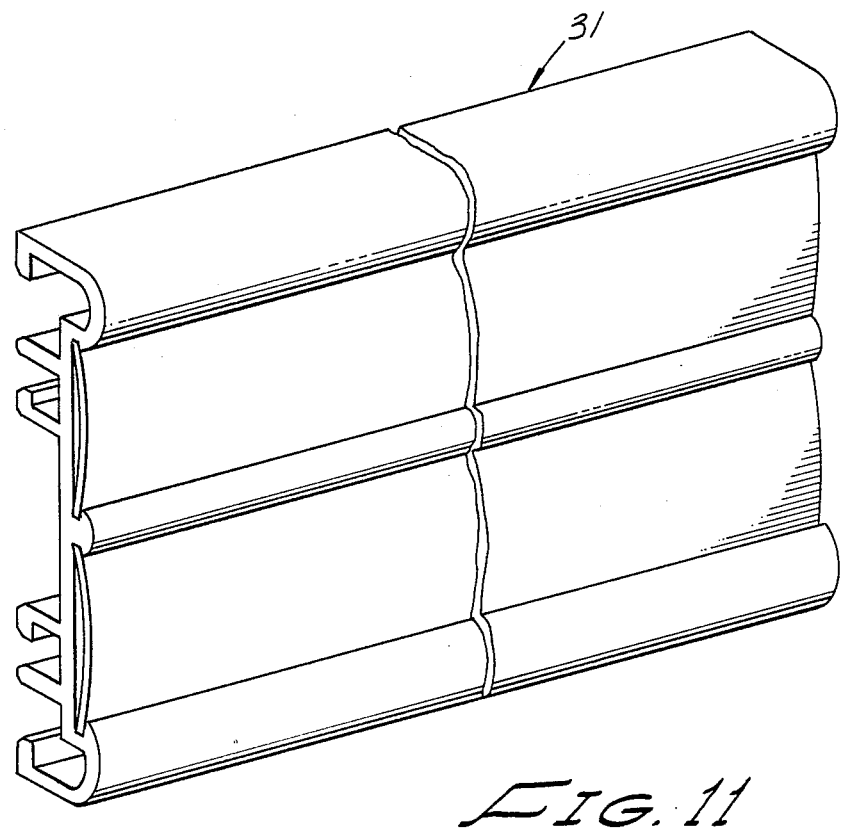
FIG. 11 is a perspective view of an alternate cornice front panel member.

Turning additionally to FIG. 10, the outer end wall 54 of the corner piece has a parallel inner wall 55 spaced therefrom including openings 56 for receiving the detents 37 when the side plate is positioned fully within the slot 53. More particularly, as shown in FIG. 7, the detents 37 deform the inner wall 55 as the side plate is moved into the slot such that when the detents are seated within the inner wall openings 56, spring reaction of the inner wall serves to releasably lock the side plates in place.

Reference is now made to both FIGS. 1 and 5, for the ensuing details of a mounting clip 57, two or more of which are typically required for mounting the entire assembled cornice to a headrail. The clip is constructed of a resilient plastic having an elongated striplike center portion 58, the lower end of which is formed substantially at 90 degrees to the main body portion and includes a pair of keys 59 at the terminus. Spaced upwardly from the keys 59 along the central body portion 58 and extending outwardly therefrom is a finger 60 ending in a further set of keys 61. The spacing between keys 59 and keys 61 is substantially identical to that between the flanges 45 and 46 on the rear face of the front panel member. More particularly, the spacing between the two sets of keys is slightly less than the spacing between slots flanges 45 and 46 so that when the keys engage the flanges 45 and 46 the clip is distended and securely holds the panel member (FIG. 5). The upper end of the clip is formed back onto itself into a hook 62 on the side opposite that containing the finger 60 and includes first and second inwardly facing gripping members 63 and 64. More particularly, member 63 extends in far enough to resiliently contact the headrail front wall when the hook 62 clamps onto the headrail wall (FIG. 5). Member 64, on the other hand, only extends inwardly just enough to clamp under the wall edge of the rolled edge 29.

In use at a given location, first the headrail and hanging slats are affixed to the vertical wall surface above the window, for example, that it is desired to cover. Next, the side plates 32 and 33 are adapted to the proper length by breaking off the excess length along one of the grooves 35, if necessary. The side plates are then snapped into the receiving slots 53 of the two corner pieces. The ends of a proper length of front panel member are forced into the corner pieces open sides 49 following which the clips 57 are mounted onto the headrail and the entire cornice assembly is then hung onto the headrail (FIGS. 2 and 5).

I claim:

1. A window covering unit having a headrail for securement to a wall surface, wall surface covering means hanging from the headrail, and a cornice mounted onto said headrail, said cornice comprising:
an elongated extruded plastic front panel having two end portions, first and second pairs of spaced generally parallel grooves on a major surface for receiving respective first and second slatlike members therein, and a pair of spaced apart slots located equidistant from the panel longitudinal axis on a further major surface generally parallel to the first and second pairs of grooves, each said slot having a slot edge formed into a flange directed into the slot;

first and second end pieces, each end piece having an opening on a first surface for slidingly receiving a front panel end portion therewithin, said opening including first and second compressible keys which are received within the front panel slots when a front panel end portion is located within the end piece slot, and each end piece having a further slotted opening on a second surface arranged at substantially 90 degrees to the first surface;

first and second side plates, each side plate including a one-piece sheetlike body with an end portion configured to enable receipt within an end piece further slotted opening and a plurality of spaced apart grooves forming break lines; and at least two molded plastic clips hangingly relating the front panel to the headrail, each clip being constructed of a material having springlike characteristics and including a hooklike first end for hanging engagement from the headrail, and a pair of finger means for receipt within the respective front panel slots, each finger means having hooklike ends which releasably lock with the slot flanges when said finger means are received within the slots.

* * * * *